United States Patent
Hagerty

(10) Patent No.: US 8,392,442 B2
(45) Date of Patent: Mar. 5, 2013

(54) METHOD AND COMPUTER PROGRAM PRODUCT FOR CREATING CONTENT MANAGEMENT SYSTEMS

(75) Inventor: Timothy Hagerty, Chesapeake, VA (US)

(73) Assignee: Dee Gee Holdings, LLC, Cape Canaveral, FL (US)

( * ) Notice: Subject to any disclaimer, the term of this patent is extended or adjusted under 35 U.S.C. 154(b) by 0 days.

(21) Appl. No.: 13/086,548

(22) Filed: Apr. 14, 2011

(65) Prior Publication Data

US 2011/0258224 A1 Oct. 20, 2011

Related U.S. Application Data

(60) Provisional application No. 61/324,357, filed on Apr. 15, 2010.

(51) Int. Cl.
  G06F 17/30 (2006.01)
(52) U.S. Cl. ......................... 707/759; 707/769
(58) Field of Classification Search .................. 707/769, 707/999.001
  See application file for complete search history.

(56) References Cited

U.S. PATENT DOCUMENTS

| | | | |
|---|---|---|---|
| 6,085,198 A * | 7/2000 | Skinner et al. ...................... 1/1 |
| 6,189,029 B1 | 2/2001 | Fuerst | |
| 7,051,039 B1 * | 5/2006 | Murthy et al. ...................... 1/1 |
| 7,231,662 B2 * | 6/2007 | Wissenbach ..................... 726/4 |
| 2005/0210061 A1 * | 9/2005 | Chang et al. .................. 707/102 |
| 2006/0010169 A1 * | 1/2006 | Kitamura ....................... 707/200 |
| 2006/0069862 A1 * | 3/2006 | Kano ............................ 711/114 |
| 2007/0294307 A1 * | 12/2007 | Chen et al. ..................... 707/200 |
| 2009/0112789 A1 * | 4/2009 | Oliveira et al. ................... 707/1 |
| 2010/0082546 A1 * | 4/2010 | Sreenivas et al. .............. 707/641 |
| 2010/0274827 A1 * | 10/2010 | Hix et al. ..................... 707/813 |

OTHER PUBLICATIONS

Merson, Paulo, Data Model as an Architectural View, Software Engineering Institute, Carnegie Mellon University, Pittsburgh, PA, Oct. 2009, Technical Note CMU/SEI-2009-TN-024—Relevant pp. 1, 19, 21.

* cited by examiner

*Primary Examiner* — Miranda Le
(74) *Attorney, Agent, or Firm* — Mark R. Malek, Esq.; William A. Harding, Esq.; Zies Widerman & Malek

(57) ABSTRACT

A computer program product is for creating a content management system that prompts a user for input of data source information to locate an existing content repository and a desired location for saving the created content management system via a user interface. The content management system creator may select and copy core files selected from a set of core files to a destination directory structure, establish a database connection, and incorporate information relating to the database connection into data tables. A created content management system may include a data storage tier, a data logic tier, and a user interface tier. The user interface tier may further include user interface definitions to view and manage data included within data storage tier by calling data table classes defined in the data logic tier.

18 Claims, 12 Drawing Sheets

METHOD AND COMPUTER PROGRAM PRODUCT FOR CREATING CONTENT MANAGEMENT SYSTEMS

RELATED APPLICATIONS

This application claims the benefit of U.S. Provisional Patent Application Ser. No. 61/324,357 titled "METHOD AND COMPUTER PROGRAM PRODUCT FOR CREATING CONTENT MANAGEMENT SYSTEMS" filed by the inventor of the present application on the Apr. 15, 2010, the entire contents of which are incorporated herein by reference.

FIELD OF THE INVENTION

The present invention relates to the field of content management and, more specifically, to the field of methods and computer program products for creating content management systems.

BACKGROUND OF THE INVENTION

As personal computers and server systems decline in price, more and more businesses and individuals are taking advantage of the content storage features of those machines to enhance daily activities. As storage media with larger and larger capacities becomes available, the amount of content that users are able to store continues to grow. Businesses are increasingly able to record and store critical performance measures, such as inventory levels for individual products, contents of a particular customer's purchase order, sales trends for items over a particular season or other calendar period, experimental result sets, logistics pathways, or delivery and maintenance schedules. Consumers are able to build repositories of digital content, including all forms of media and personal documents, as well as create catalogs for physical items, such as books in a library.

Many times, while the storage facilities are generally provided, including physical data capacity and software that interfaces with an operating system to maintain the digital representation of content, suitable application software is not provided for allowing users to effectively manage their content. A business may have many large quantities of information in a data warehouse, filled with data from several operational systems, but no convenient interface for viewing, editing, adding to, or deleting any of that information. Individuals may similarly have large amounts of content that cannot be accessed in any meaningful way.

Often the only solution is to employ one or more persons possessing advanced software development skills that can create a content management system for use in viewing or maintaining content. For individuals, this solution may be far too expensive. For small businesses, which may not be able to justify having a fulltime IT staff, this solution is equally prohibitive. Contract or short-term help, such as consultants, may be utilized to build an appropriate content management system, but long-term supportability may represent hidden costs, especially in situations where the created system is damaged or destroyed, for example, through hardware failure or viral infection. Some companies provide a solution, though hosting a content management system that is accessible using an Internet connection. However, with those solutions, users may not be permitted to customize or modify their content management system, because they are not given sufficient access to the code project for making such changes. Additionally, hosted solutions provide their content management systems as a service, which must be paid for on a periodic basis (e.g., monthly) otherwise they shut down, leaving a user without anything at all to work with.

What is needed is a computer program product that is capable of collecting a few simple options for a user which can then build a content management system that can be used to view, modify, add to, and delete a given content repository.

SUMMARY OF THE INVENTION

The present invention provides a computer program product and method for creating content management systems that fills all of the deficiencies of the prior art. According to a preferred embodiment of the present invention, a computer program product is disclosed, which performs the steps of querying the user for information regarding the location of an existing content repository and the desired location storing a resulting content management system, inspecting the specified existing content repository, and creating a system that is capable of managing the content stored in the specified repository.

The computer program produce according to the present invention is advantageously capable of performing the repetitive steps involved with building a suitable content management system, quickly creating the desired project based on the location and structure of the given repository. The resulting code could be modified and customized as required. In the event that a project is damaged or destroyed, a new project may again be created quickly and easily. For a consulting team, the computer program product according to the present invention could permit a manager, for example, to perform a high level task of generating a base content management system, which may then be suitable for passing to a junior analyst tasked with providing a specific solution to the customer.

A computer program product for creating a content management system of the present invention may comprise a user interface that prompts a user for input of data source information to locate an existing content repository and a desired location for saving the content management system, and a content management system creator to create the content management system from the existing content repository. The content management system may further comprise a data storage tier including data tables and a data logic tier in communication with the data storage tier that includes data table classes to control an exchange of data with the data tables. The data table classes may direct movement of the data between the data tables. The content management system may also include a user interface tier in communication with the data storage tier and the data logic tier that includes user interface definitions which, in turn, include a viewing user interface, a record adding user interface, or a record editing user interface.

The computer program product may additionally include a set of core files that include the data table classes selectable by the content management system creator. The computer program product may receive the data source information. The computer program product may also copy core files that are selected by the content management system creator to a destination directory structure located at the desired location. The computer program product may further establish a database connection between the data source information and the destination directory structure.

The computer program product may incorporate information relating to the database connection into the data tables. Content in the existing content repository may include the data tables and the data. The computer program product may also retrieve and analyze a list of the data tables to identify the data tables that have not been processed from the list of the data tables. The computer program product may further be used to process the data tables that have not been processed.

The computer program product according to an embodiment of the present invention may include an input field, a button, a creation option, and/or a progress display.

The core files may include a project file and/or a core parent class file. The content management system creator may create a core class definition file for the data tables identified as having not been processed. The core class definition file may include the data table classes that control exchange of the data with the data tables. The content management system creator may also create a core interface file that defines the user interface definitions. The content management system creator may retrieve the data from the data tables by executing a query statement that returns the data included in the data tables. The viewing user interface may present the data table. The record adding user interface may allow creation of the data table, and the record editing user interface may allow modification of data table.

The system according to the present invention also advantageously provides that the received location information may be validated.

A method aspect of the present invention is directed to the operation of the computer program product of the present invention. The method may include prompting a user for input of data source information to locate an existing content repository and a desired location for saving the content management system via the user interface. Content in the existing content repository may include data tables and/or data. The method may also include receiving the data source information, copying core files that are selected by the content management system creator from the set of core files to a destination directory structure located at the desired location, and establishing a database connection between the data source information and the destination directory structure.

The method may further include incorporating information relating to the database connection into the data tables and retrieving and analyzing a list of the data tables to identify the data tables that have not been processed from the list of the data tables. The method may still further include processing the data tables that have not been processed and creating the content management system. Creation of the content management system may include creating a data logic tier that includes the data table classes that direct movement of the data between the data tables. The data logic tier may control an exchange of the data with the data tables and may be positioned in communication with a data storage tier that includes the data tables. The method may further include creating a user interface tier in communication with the data storage tier and the data logic tier that includes user interface definitions which, in turn, include a viewing user interface, a record adding user interface, and/or a record editing user interface.

DETAILED DESCRIPTION OF THE PREFERRED EMBODIMENTS

Figure 1:
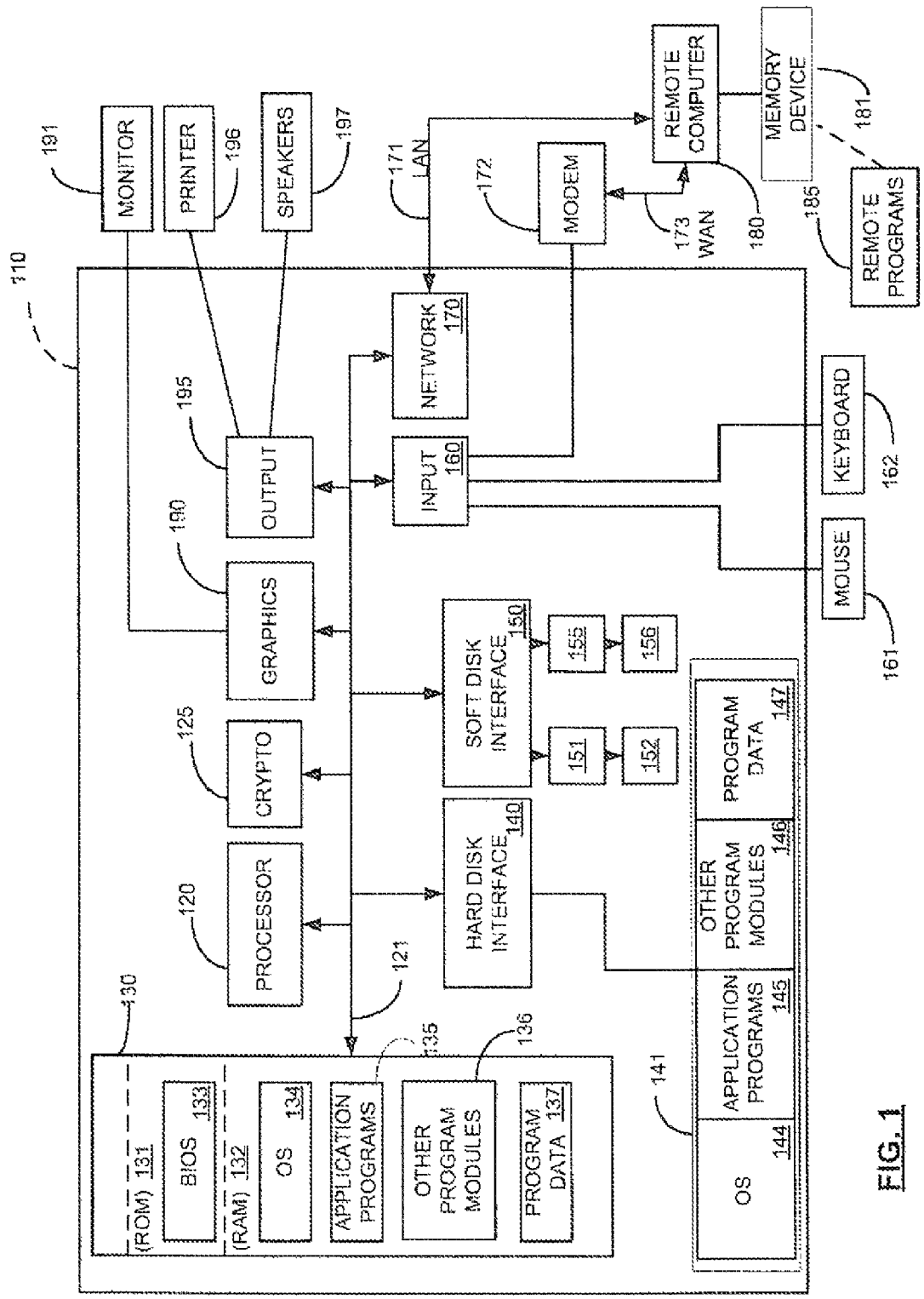
FIG. 1 is a block diagram of a computer, which may be configured to perform certain machine-implemented steps embodied within one or more method aspects of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Embodiments of the present invention are described herein in the context of a system of computers, servers, and software. Those of ordinary skill in the art will realize that the following embodiments of the present invention are only illustrative and are not intended to be limiting in any way. Other embodiments of the present invention will readily suggest themselves to such skilled persons having the benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps, and/or data structures may be implemented using various types of operating systems, computing platforms, computer programs, and/or general purpose machines. In addition those of ordinary skill in the art will recognize, after having the benefit of this disclosure, that devices of a less general purpose nature, such as hardwired devices, field programmable gate arrays (FPGAs), application specific integrated circuits (ASICs), or the like, may also be used without departing from the scope and spirit of the inventive concepts disclosed herein.

The computer program product 10, according to an embodiment of the present invention, may be a computerized system that requires one or more steps be performed on or in association with a computerized device, such as, but not limited to, a server, a computer (i.e., desktop computer, laptop computer, netbook, or any machine having a processor), a dumb terminal that provides an interface with a computer or server, a personal digital assistant, mobile communications device, such as an smartphone, mobile computing device, or other similar device that provides computer or quasi-computer functionality, a mobile reader, such as a Kindle, which provides reader functionality that may be enabled, through either internal components or connecting to an external computer, server, or global communications network (such as the Internet), to take direction from or engage in processes which are then delivered to the mobile reader. It should be readily apparent to those of skill in the art, after reviewing the materials disclosed herein, that other types of devices, individually or in conjunction with an overarching architecture, associated with an internal or external system, may be utilized to provide the "computerized" environment necessary for the at least one process step to be carried out in a machine/system/digital environment. It should be noted that the method aspects of the present invention are preferably computer-implemented methods and, more particularly, at least one step is preferably carried out using a computerized device.

FIG. 1 illustrates a computing device in the form of a computer 110, which is capable of performing one or more computer-implemented steps in practicing the method aspects of the present invention. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In other embodiments, the functions of the cryptographic unit may be instantiated in software and run via the operating system.

A computer 110 typically includes a variety of computer readable media. Computer readable media can be any available media that can be accessed by a computer 110 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by a computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates an OS 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing an OS 144, application programs 145, other program modules 146, and program data 147. Note that these components can either be the same as or different from operating system 134, application programs 135, other program modules 136, and program data 137. The OS 144, application programs 145, other program modules 146, and program data 147 are given different numbers here to illustrate that, at a minimum, they are different copies. A user may enter commands and information into the computer 110 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

The communications connections 170, 172 allow the device to communicate with other devices. The communications connections 170, 172 are an example of communication media. The communication media typically embodies computer readable instructions, data structures, program modules or other data in a modulated data signal such as a carrier wave or other transport mechanism and includes any information delivery media. A modulated data signal may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

According to an embodiment of the present invention, a computer program product 10 is disclosed, which is capable of creating content management systems 400. Such a computer program product 10 may be capable of inspecting an existing content repository and building a system for managing that content. A computer program product 10, according to an embodiment of the present invention, will be described in further detail as a product that is creatable using, for example, but not intended as a limitation, Microsoft's Visual C# .NET development environment. Such a computer program product 10 would be suitable for execution on a computer 110 having, for example, but not intended as a limitation, one of Microsoft's Windows family of operating systems loaded into memory 134. A person having skill in the art, after having the benefit of this disclosure, would recognize that many other development platforms might be used to create a computer program product 10, which may be executable with many other operating systems, but that still embody the present invention. As such, the following disclosure is provided merely for explanatory purposes and should in no way limit the present invention to computer program products that are created using the aforementioned development platform or for use with the aforementioned operating systems.

For clarity in the foregoing description, a plurality of terms that are commonly used within the art may be used to describe features of a user interface. For illustrative purposes without limitation, such terms may include check boxes, input fields, text fields, radio buttons, dropdown menus, text boxes, hypertext links, Active X elements, date pickers, or other data display or gathering elements and features. A skilled artisan should appreciate the definition of these terms, as they are known within the art. A skilled artisan should also note that the inclusion of these terms are provided as an example of possible embodiments of a feature or element in a user interface designed to display or gather information. As such, a person of skill in the art, after having the benefit of this disclosure, should not view the inclusion of these terms as limiting in any way. Furthermore, skilled artisans, after having the benefit of this disclosure, should appreciate a plethora of additional elements or features that may be used for displaying or gathering information included within the scope and spirit of the present invention.

Figure 2:
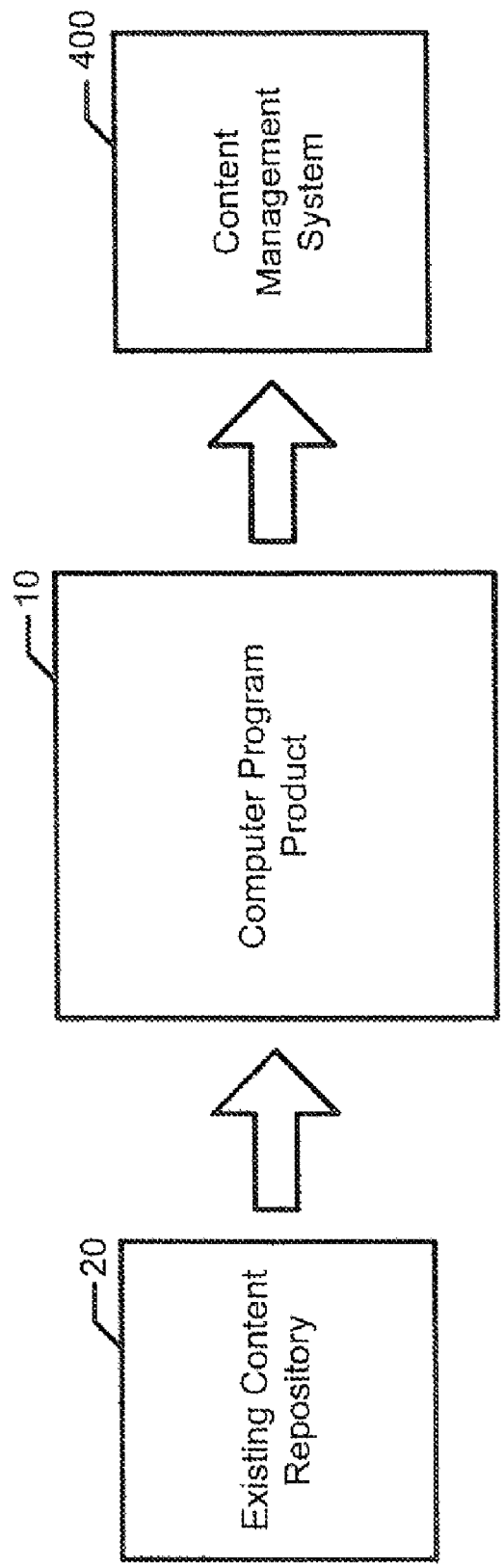
FIG. 2 is a block diagram illustrating creation of a content management system from an existing content repository via a computer program product of the present invention.

Referring now to FIG. 2, a computer program product 10 for generating a content management system 400 of the present invention will now be described. More specifically, a top level block diagram is presented to illustrate the general operation of the computer program product 10 of the present invention. As shown in FIG. 2, an existing content repository 20 may be provided to the computer program product 10 of the present invention. This operation will be further illustrated in FIGS. 3 and 4 and further described in the paragraphs accompanying those figures.

A computer program product 10, according to an embodiment of the present invention, may be capable of presenting a user interface 200 to the user, which is designed to collect all of the information required to build a desired content management system 400. Such a user interface might be capable of collecting information about the location of an existing content repository 20, a name for the content management system that will be created, and a desired location in which to store the created content management system 400. In addition, such a user interface may present various other options that can be selected by a user. For example, but not intended as a limitation, a check box style input, as understood by those having skill in the art, may be provided that records the user's desire to either create or not create a user interface tier for the resulting content management system 400.

Figure 2A:
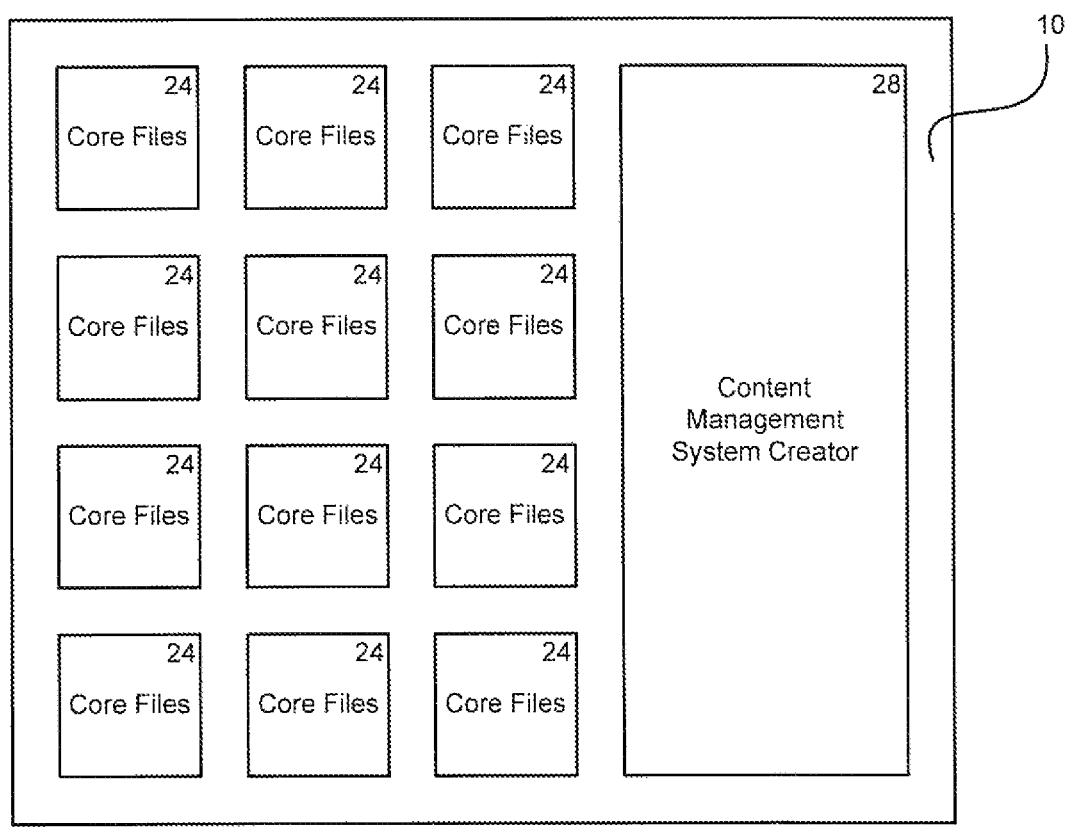
FIG. 2A is a block diagram illustrating the computer program product of the present invention.

Referring now to FIG. 2A, a computer program product 10 for generating a content management system 400 of the present invention will now be described. Generally, the computer program product 10 of the present invention may receive content, from which the computer program product may generate a content management system 400. More specifically, the computer program product 10 of the present invention may generate a content management system 400 with a multiple tiered structure capable of providing user interface definitions for accessing and organizing data, as further illustrated in FIG. 2B.

Continuing to refer to the block diagram illustrated in FIG. 2A, the computer program product 10 of the present invention may include a content management system creator 28 and core classes 24. As will be described in more detail below in the disclosure, the content management system creator 28 may create the content management system 400 through the compilation of one or more core classes 24 included within the computer program product 10. A person of skill in the art will appreciate that additional components or elements may be included within the computer program product 10 and remain within the scope and spirit of the present invention.

Figure 2B:
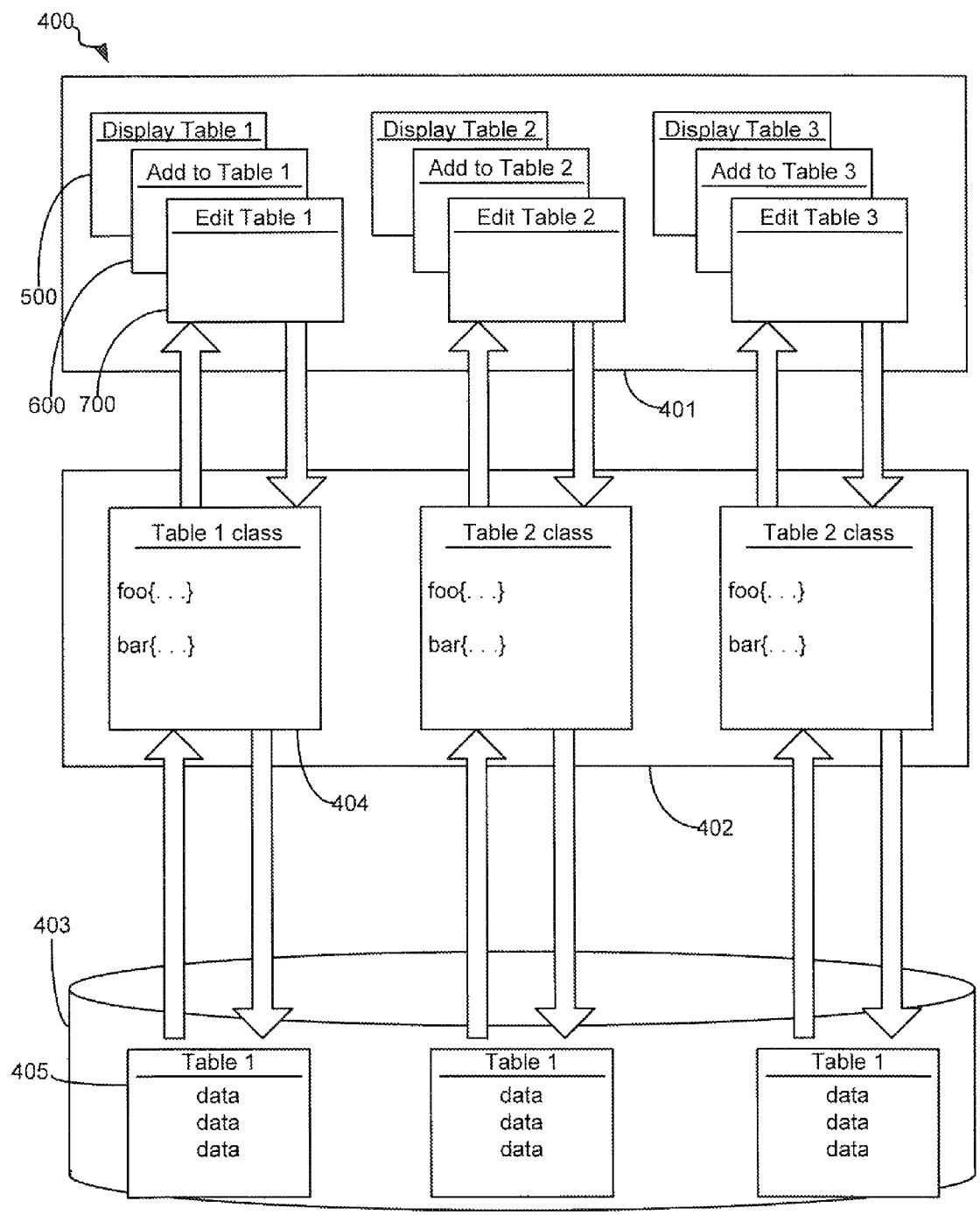
FIG. 2B is a block diagram illustrating a three tiered content management system, according to an embodiment of the present invention.

Referring now to FIG. 2B, a content management system 400 generated by the content program product 10 of the present invention will now be described. More specifically, the content management system 400 may include a multiple tiered structure capable of providing user interface definitions for accessing and organizing data. The accessing and organizing of data may be handled by calling various classes. A person of skill in the art will appreciate that a class may include an instruction, or set of instructions, that may be used to perform a calculation or operation by a computerized system. Each tier of the content management system 400 may communicate with at least one other tier, which may collectively provide intercommunication between all tiers.

Continuing to refer to the block diagram illustrated in FIG. 2B, according to an embodiment of the present invention, a content management system 400 may be created as a three tier application. These three tiers may include a data storage tier 403, a data logic tier 402, and a user interface tier 401. A person having skill in the art will appreciate that a content management system 400 may be created within the scope of the present invention utilizing any number of tiers, and should not limit the present invention to a three tier embodiment.

The data storage tier 403 will now be described in greater detail. A content repository may be included within the data storage tier 403, which may contain a plurality of content or data. The content repository included in the data storage tier may be derived from an existing content repository, which may be provided by a user. As a non-limiting example, a content repository may be in the form of a database, which may contain one or more data tables 405. Data may be stored in the data tables 405, wherein it may be accessed and/or manipulated by data table classes 404. In an embodiment of the present invention, the data tables 405 may further include one or more data columns. When included, the data table 405 may utilize the data columns to further organize the data included therein.

For clarity in the foregoing disclosure, the present invention will be described with the assumption that data stored within the data storage tier 403 is in the form of a database. The database, as it will be hereinafter described, may include the aforementioned data tables 405. A person of skill in the art will appreciate, after having the benefit of this disclosure, that a plurality of data storage structures may be used to organize and manage data in the data storage tier 403 and remain within the scope of the present invention. Therefore, this disclosure is not intended to limit, and thus should not be understood to limit, the present invention to embodiments wherein data is stored in a database.

The data logic tier 402 will now be described in greater detail. The content management system 400 of the computer program product 10 according to an embodiment of the present invention may comprise a plurality of data table classes 404, included within the data logic tier 402. The data table classes 404 may provide computer operations or methods to control the exchange of data included within the data storage tier 403. This exchange operation may be accomplished by reading and writing data to and from the content repository, which is included within the data storage tier 403. A person having skill in the art, after having the benefit of this disclosure, would appreciate that a data table class 404 may be derived from one or more parent classes, which are included within the core files 24. Such methods and other member elements common to all data table classes 404 may be expressed in a parent class. Similar to the instructions included in a class, as described above, a parent class may include a library of instructions that may be used to perform calculations or operations by a computerized system. However, only the methods and members required by a particular data table 405 may be necessary to be expressed in an associated data table class 404. As a result, the computer program product 10 of the present invention may advantageously limit the number data table classes 404 included in a resulting content management system 400. The limiting of data table classes 404 may further advantageously provide lean and efficient resulting content management systems 400, which may be more optimized for shared or web based interfaces.

Figure 4:
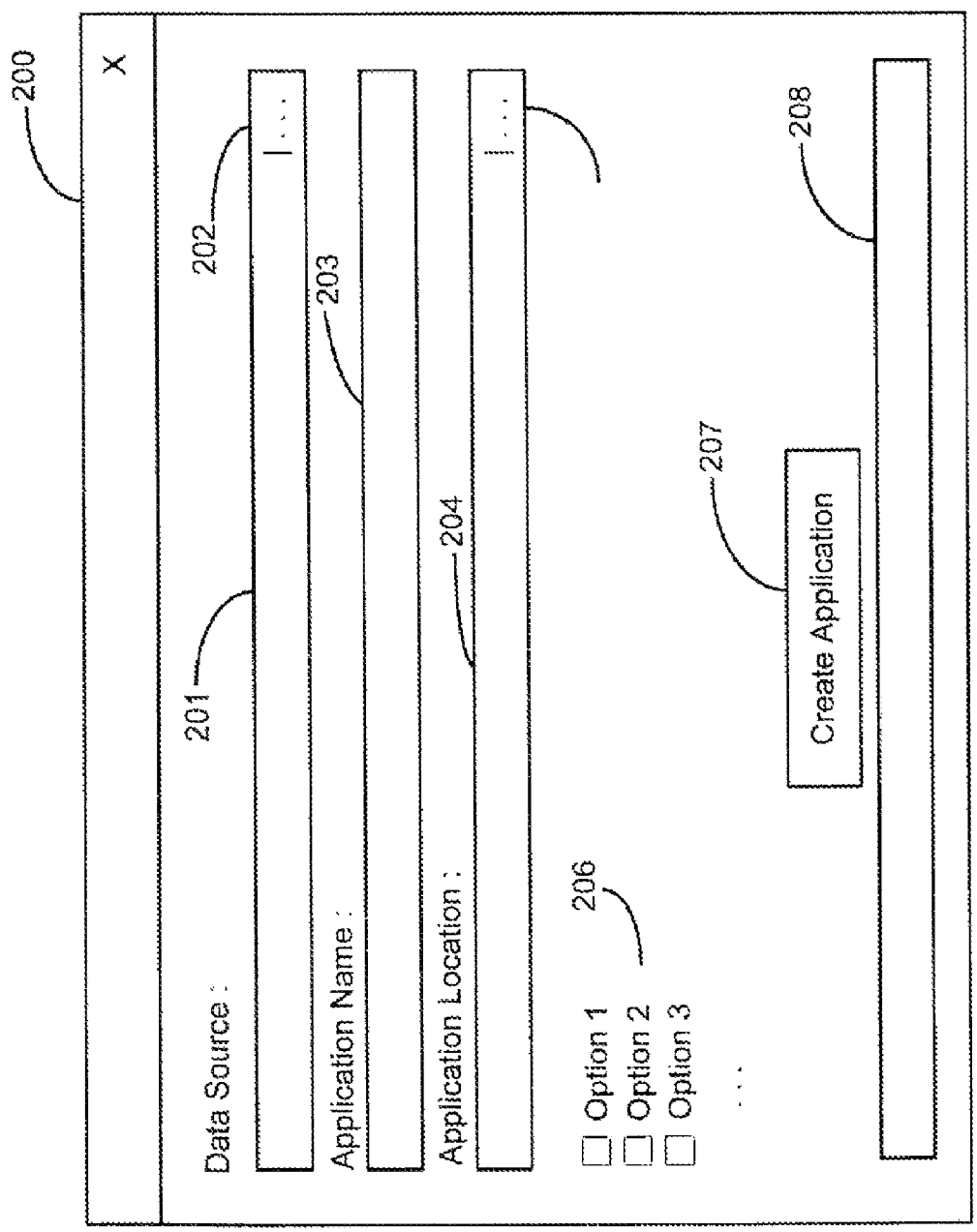
FIG. 4 is a schematic representation of a content management system creation user interface, which is configured in accordance with an exemplary embodiment of the present invention.

In another aspect of the present invention, a content management system 400 may include a user interface tier 401, which will now be described in greater detail. The user interface tier 401 may provide one or more user interface definitions. As an example, but not intended as a limitation, appropriate user interface definitions may be provided in the form of a web interface, or webpage files such as those created using Microsoft's ASP.NET language conventions. Other non-limiting examples of user interface files that may be provided in a user interface tier 401 include PHP template scripts, JavaServer Pages (JSP), Hypertext Markup Language (HTML) and Cascading Style Sheet (CSS) files that use asynchronous JavaScript and XML (AJAX), or suitable class definition files that describe one or more window objects, as understood by those having skill in the art. A user may indicate their desire to create one or more types of user interface files, as well as which type of user interface files to create, by making the appropriate selections using various content management system creation options 206 (FIG. 4).

A user interface tier 401 may comprise one or more user interface definitions. These user interface definitions may call one or more member elements of a data table class 404, located within the data logic tier 402, to access one or more data tables 405 within a content repository. The content repository may be located within the data storage tier. As non-limiting examples of user interface definitions, a user interface tier 401 may include a table viewing user interface 500, a record adding user interface 600, or a record editing user interface 700. A person of skill in the art will appreciate, after having the benefit of this disclosure, that additional user interface definitions may be included in the content management system 10. Such further non-limiting examples, that will not be discussed further herein, may include a delete user interface definition, a merge user interface definition, an publish user interface definition, or a plethora of additional user interface definitions that may be provided to perform a desired data management operation.

The computer program product 10 of the present invention may accept an existing content repository 20 and create a corresponding content management system 400, which may be used to easily access and manage the data stored within a database. The computer program product 10 may automatically create the files and connections associate with the content management system 400, advantageously reducing the time required for manual programming and debugging compiling errors.

Figure 3:
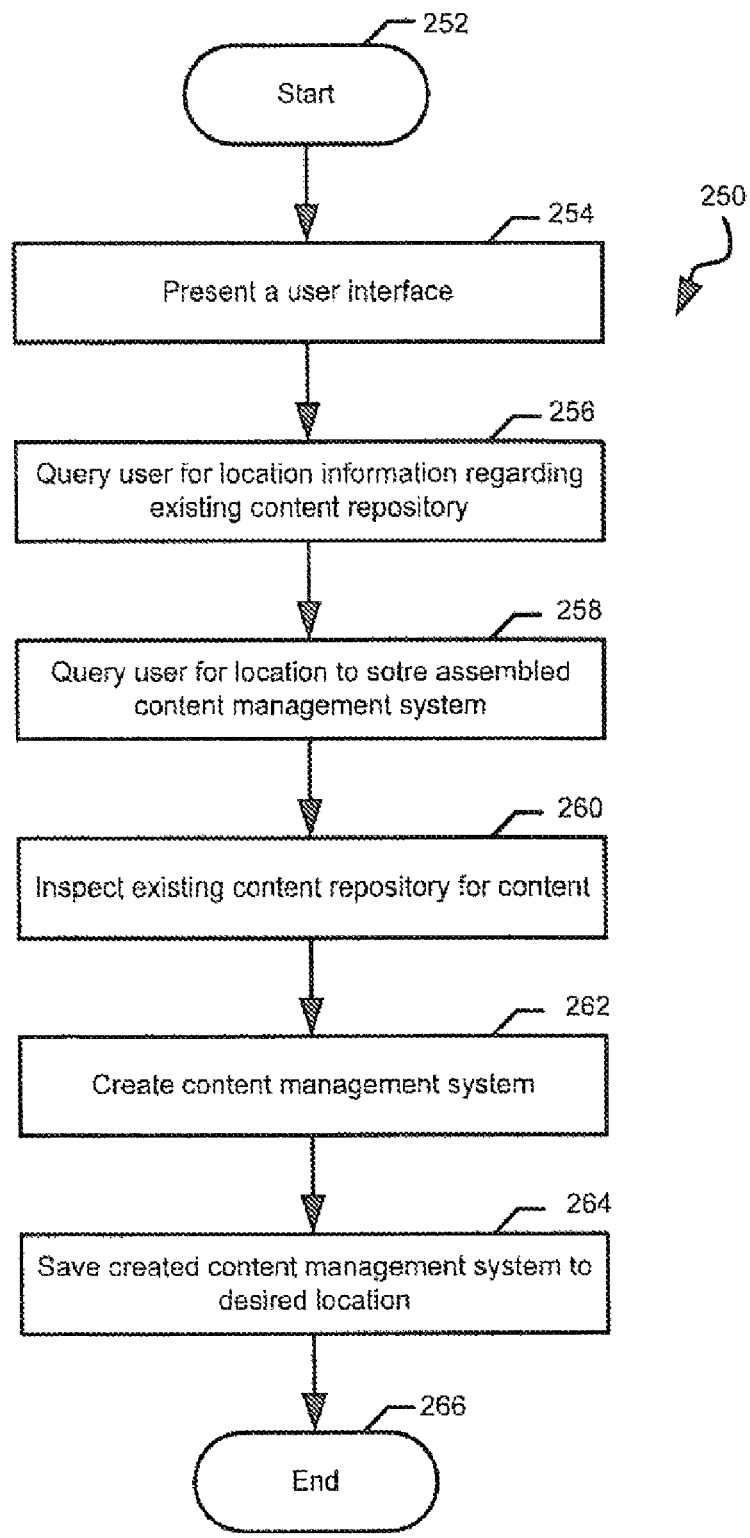
FIG. 3 is a flowchart illustrating a method aspect of the present invention relating to the steps in creating a content management system.

Referring now additionally to FIG. 3, the operation of creating a content management system 400 will now be discussed in greater detail. More specifically, as illustrated in flowchart 250, the operation of receiving content from an existing content repository 20 and assembling the content management system 400 will now be discussed. In the following discussion, various steps refer the operation of the computer program product 10 involving a user. A person of skill in the art will appreciate additional embodiments of the present invention that may not require user interaction. Such embodiments, for example, may instead query a computer or other automated system for the information required.

Starting at Block 252, the computer program product 10 of the present invention may present a user interface 200 at Block 254. The user interface 200 may be presented to a user, advantageously allowing the user to create the content management system 400 from an easy-to-use interface. An example of such a user interface is illustrated by FIG. 4, and will be discussed below in correspondence with the aforementioned illustration. The computer program product 10 of an embodiment of the present invention may query a user for location information regarding an existing content repository 20 (Block 256). The computer program product 10 may also query the user for the location information regarding the desired location to store the created content management system 400 (Block 258). The desired location to store the created content management system 400 may, for example, include a web server, a local server, an individual terminal, or other system capable of storing the created content management system.

The computer program product 10 of the present invention may inspect the existing content repository 20 for the content included therein (Block 260). During the inspection, the computer program product 10 according to an embodiment of the present invention may determine which content, or existing data, may be used in creating the content management system 400. After the inspection has finished, the computer program product 10 may create the content management system 400. The creation process will be described in more detail below, with reference to FIG. 5 (Block 262). The computer program product 10 may then save the created content management system 400 to the desire location (Block 264), as specified in the operation described in Block 258. After saving the content management system 400, the computer program product 10 may then terminate its operation at Block 266.

Referring now to FIG. 4, a schematic diagram is provided in accordance with an embodiment of the present invention for a content management system 400 creation user interface 200. The following exemplary content management system creation user interface 200 is provided as a non-limiting example, which may be suitable for display on, for example, a monitor 191. The following example content management system 400 creation user interface 200 may collect information about a desired content management system from a user via a "Data Source" input field 201, an "Application Name" input field 203, an "Application Location" input field 204, a plurality of content management system creation options 206, a "Create Application" button 207, and a progress display 208.

A "Data Source" input field 201, according to an embodiment of the present invention, may be provided in the form of a text box, as understood by those having skill in the art. Such a text box may be capable of taking user input that is provided by depressing the appropriate keys on a keyboard 162 while the input focus is within a "Data Source" input field 201. Using a "Data Source" input field 201, a user may input a connection string, as understood by those having skill in the art, which may provide information necessary for the computer program product of the present invention to locate and connect to a content repository. Suitable content repositories may include, but should not be limited to, databases that are stored using Microsoft's SQL Server relational database management software, wherein the content to be managed would be the tables and data records stored in those databases. It would be apparent to someone having skill in the art, after having the benefit of this disclosure, that a "Data Source" input field 201 may be presented with a data source browser button 202, which may be configured to display a standard data source dialog, as understood by those having skill in the art, to simplify the process of specifying a data source connection string.

An "Application Name" input field 203 may be provided in the form of a text box, as understood by those having skill in the art. Such a text box may be capable of taking user input that is provide by depressing the appropriate keys on a keyboard 162 while the input focus is within an "Application Name" input field 203. Using an "Application Name" input field 203, a user may input a desired name to be associated with a content management system that is created by a computer program product, according to an embodiment of the present invention.

An "Application Location" input field 204, according to an embodiment of the present invention, may be provided in the form of a text box, as understood by those having skill in the art. Such a text box may be capable of accepting a user input, which may be provided by depressing the appropriate keys on a keyboard 162 while the input focus in within an "Application Location" input field 204. Using an "Application Location" input field 204, a user may input a file system location where a resulting content management system may be stored after being created by the computer program product. It would be apparent to someone having skill in the art, after having the benefit of this disclosure, that an "Application Location" input field 204 may be presented with a directory browser button 205 configured to display a standard file system directory selection dialog, as understood by those having skill in the art. The inclusion of the directory browser button 205 may advantageously simplify the process of specifying a file system location.

Content management system creation options 206, according to an embodiment of the present invention, may be provided in the form of a plurality of check boxes, as understood by those having skill in the art. Other controls, such as radio buttons, dropdowns, track bars, or date pickers, as persons having skill in the art would understand each of those terms, may be used to collect a user's preferences for creating a content management system. After having the benefit of this disclosure, it would be apparent to a skilled artisan that the type of control element to be used will depend on the type of preference to be obtained from a user. For example, but not intended as a limitation, a user may wish to create the data logic tier of a content management system, but forego the creation of the user interface tier, or vice versa. To provide a user with such options, two standard check box controls may be provided, one that records a user's desire to create a user interface tier and another that records a user's desire to create a data logic tier. As another non-limiting example, a dropdown may be provided, which enumerates two or more possible target programming languages that may be used in creating a content management system.

A "Create Application" button 207, according to an embodiment of the present invention, may be provided in the form of a command button, as understood by those having skill in the art. Such a command button may be capable of taking user input that is provided by depressing the buttons on a mouse 161.

Once the characteristics for the desired content management system have been specified, the content management system may be created. Using a "Create Application" button 207, the creation of the content management system may be initiated. After a user clicks on a "Create Application" button 207, the computer program product 10 of the present invention may provide feedback regarding the status of a content management system creation via a progress display 208. The progress display 208 may be provided in the form of a graphical progress bar. More specifically, presented as a non-limiting example, the progress bar may be a graphical progress bar that fills with color from left to right, indicating the percentage of the content management system creation process that has been completed. A progress display 208 may further include text prompts, which may change to indicate the step of a content management system creation process that is currently executing.

Figure 5:
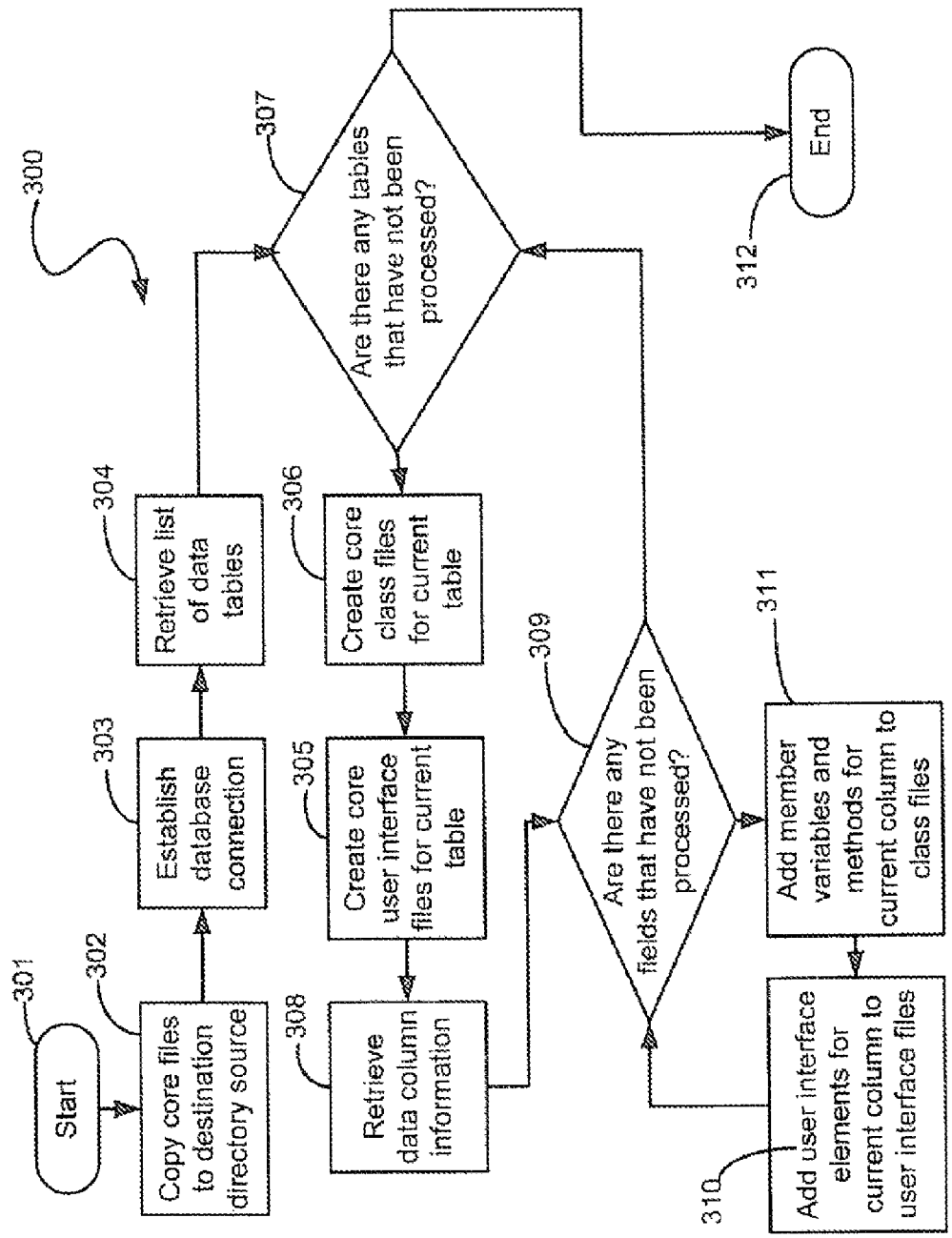
FIG. 5 is a flowchart illustrating a method aspect of the present invention relating to the steps in assembling a content management system.

Referring now additionally to flowchart 300 of FIG. 5, a non-limiting example of an illustrative creation process performed by the computer program product 10 of the present invention will now be discussed in greater detail. More specifically, a non-limiting example of the steps in executing a computer program product 10 that create the content management system 400 will now be discussed. From the start (Block 301), a set of core files 24 may be copied to a destination directory structure, whose desired location may be supplied in an "Application Location" field 202 of a user interface 200 (Block 302). It would be apparent to a person having skill in the art, after having the benefit of this disclosure, that certain portions of a content management system 400 could be identical from one instance to another, such that certain core files 24 could be stored in a repository and simply copied to a destination directory structure. Such core files 24 may include, but are not limited to, project files, core parent class files, the files necessary to implement a standard user authentication screen, the files necessary to implement a standard home screen, or the files necessary to implement a standard application options screen. It would also be apparent to a skilled artisan that a computer program product 10 for creating content management systems 400 might also be designed to create and fill any required core files 24, instead of copying from a set of preexisting core files 24.

After copying any core files 24 to a destination directory structure in Block 302, the computer program product 10 of the present invention may establish a database connection in Block 303 by using data source information, which may be supplied in the "Data Source" field 201 of a user interface 200. A person having skill in the art, after having the benefit of this disclosure, would recognize that the steps in Blocks 302, 303, and 304 might be performed in any order, including without limitation, simultaneously.

After establishing a database connection in Block 303, the computer program product 10 of the present invention may retrieve a list of data tables 405 in Block 304. A list of data tables 405 may be obtained, for example, but not meant as a limitation, by executing a query statement designed to return a record set that may include a list of available data tables 405. As another non-limiting example, a list of data tables 405 could be obtained by using third-party provided data access classes, such as Microsoft's ADO.NET connection classes, to execute a provided method for retrieving the desired information.

Once a list of data tables 405 has been retrieved in Block 304, it may be determined whether there are any data tables 405 that have not been processed in Block 307. If it is determined in Block 307 that there are no data tables 405 that have not been processed, the method can be ended at Block 312. Otherwise, if it is determined in Block 307 that there are data tables 405 that have not been processed, a set of core class definition files may be created for the next available table in Block 306. Core class definition files may contain suitable classes for performing required operations with the current data table 405. For example, but not meant as a limitation, a class may be defined with methods for retrieving all records from the current data table 405, updating one or more record in the current data table 405, adding new records to the current data table 405, or deleting one or more records from the current data table 405. A person having skill in the art, after having the benefit of this disclosure, will appreciate that suitable data table classes 404 may be derived from third-party provided data access objects, such as Microsoft's ADO.NET data table classes. It would be apparent to a person having skill in the art, after having the benefit of this disclosure, that the step in Block 306 may optionally be omitted based on the selections that have been made using various content management system creation options 206.

After creating core class definition files in Block 306, core user interface files can be created in Block 305. Core user interface files may include code that defines the user interface definitions presented to a user while using a created content management system 400. For example, but not meant as a limitation, user interface files may be created to collect information for inserting a new record into the data table 405 or for modifying the data in an existing record.

A person having skill in the art, after having the benefit of this disclosure, would appreciate that appropriate user interface files could be created for many different platforms. For example, but not intended as a limitation, user interface files could be created that are suitable for display in a web browser, such that any client computer 110 capable of executing a standard browser that may properly display a user interface included in a content management system 400. As another non-limiting example, appropriate source code files could be created, which may be suitable for compilation as a desktop application, using a third-party software development studio such as Microsoft's Visual C# .NET development environment. It would be apparent to a person having skill in the art, after having the benefit of this disclosure, that the step in Block 305 may optionally be omitted based on the selections that have been made using various content management system creation options 206.

After core user interface files have been created in Block 305, the computer program product 10 may retrieve data column information for the current data table 405 in Block 308. Data column information may be obtained, for example, but not meant as a limitation, by executing a query statement that is designed to return a record set containing information about the data column in the current data table 405. As another non-limiting example, a list of data columns could be obtained by using third-party provided data access classes, such as Microsoft's ADO.NET connection classes, to execute a provided method for retrieving the desired information. Such desired information about the data columns in a data table 405 might include, as a non-limiting example, a list of the column names, column data types, or an indication of which columns are used in any data table index or foreign key, as understood by those skilled in the art. A skilled artisan, after having the benefit of this disclosure, would recognize that the steps in Blocks 305, 306, and 308 might be performed in any order, including without limitation, simultaneously.

Once the required data column information has been retrieved in Block 308, it may be determined in Block 309 whether there are any columns in the current data table 405 that have not been processed. If it is determined in Block 309 that there are no columns in the current table that have not been processed, the computer program product 10 may return to the operation illustrated by Block 307, wherein it can be determined whether there are any data tables 405 that have not been processed. Otherwise, if it is determined in Block 309 that there are columns that have not been processed, appropriate member variables and methods can be added for the next available column to the core class definition files for the current data table 405 in Block 311. It would be apparent to a person having skill in the art, after having the benefit of this disclosure, that the step in Block 311 may be optionally omitted based on the selections that have been made using various content management system creation options 206. The operation performed in Block 311 is further illustrated in FIG. 6 and will be described in greater detail below.

After member variables and methods have been added to the core class definition files for the current table in Block 311, the appropriate user interface elements may be added to the user interface files for the current data table 405 in Block 310, such that the data in the current column may be displayed and modified with the created content management system 400. It would be apparent to a person having skill in the art, after having the benefit of this disclosure, that the step in Block 310 may be optionally omitted based on the selections that have been made using various content management system creation options 206. Once the appropriate user interface elements have been added to the user interface files for the current table in Block 310, the computer program product 10 may return to the operation illustrated by Block 309, wherein it may be determined whether any columns in the current data table 405 have not been processed. The operation performed in Block 310 is further illustrated in FIG. 7 and will be described in greater detail below. Additionally, a person having skill in the art, after having the benefit of this disclosure, would recognize that the steps in Blocks 310 and 311 might be performed in any order, including without limitation, simultaneously.

Figure 6:
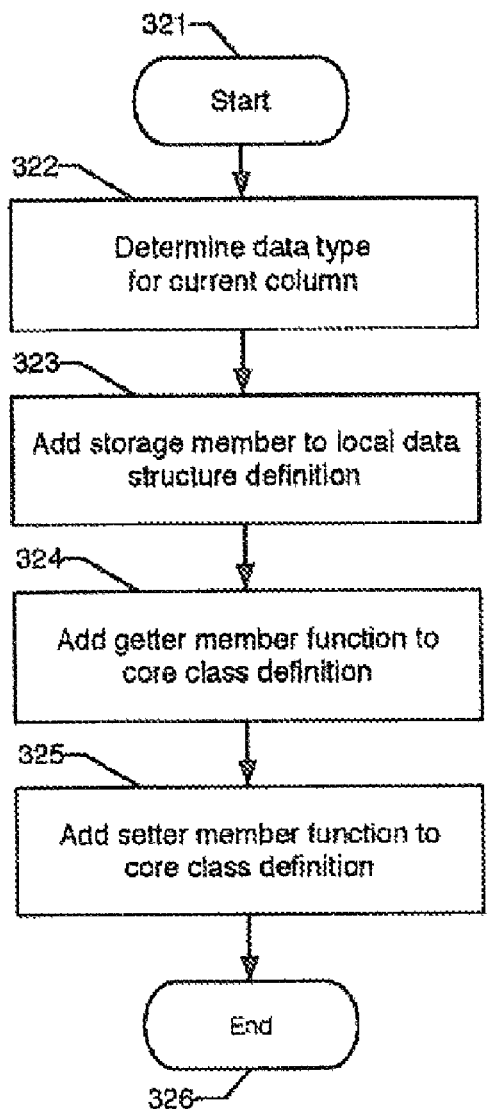
FIG. 6 is a flowchart illustrating a method aspect of the present invention relating to the steps in updating a core class definition for a single data column.

Turning now to FIG. 6, a non-limiting example of the steps in updating a core class definition for a single data column, according to an embodiment of the present invention, is illustrated in flowchart 311. From the start (Block 321) it can be determined what data type the currently processing column is designed to store, as understood by those having skill in the art, in Block 322. Once the data type of the currently processing column is determined in Block 322, a storage member having the appropriate data type may be added to a local data structure definition in Block 323. Those having skill in the art, after having the benefit of this disclosure, would appreciate that a local data structure may be used to store a copy of values from a content repository in volatile memory during execution of a content management system 400 created according to embodiments of the present invention. It would also be understood that a local data structure might be defined as part of a core class definition, as described in reference to FIG. 5.

Once a storage member has been added to a local data structure definition in Block 323, an appropriate getter member function may be added to a core class definition in Block 324. An appropriate getter member function, for example, but not intended as a limitation, may be configured to retrieve one or more values associated with the currently processing data column from a content repository upon execution of a content management system. A person having skill in the art, after having the benefit of this disclosure, would appreciate that an appropriate getter function might also be configured to return one or more values from a local data structure residing in volatile memory which may correspond to the values stored in a content repository.

After a getter member has been added to a core class definition in Block 324, an appropriate setter member function may be added to a core class definition in Block 325. An appropriate getter member function, for example, but not intended as a limitation, may be configured to store one or more values associated with the currently processing data column to a content repository upon execution of a content management system 400. A person having skill in the art, after having the benefit of this disclosure, would appreciate that an appropriate setter function might also be configured to store one or more values to a local data structure residing in volatile memory and written later to a content repository. Once a setter member has been added to a core class definition in Block 324, the method may be ended at Block 326.

Figure 7:
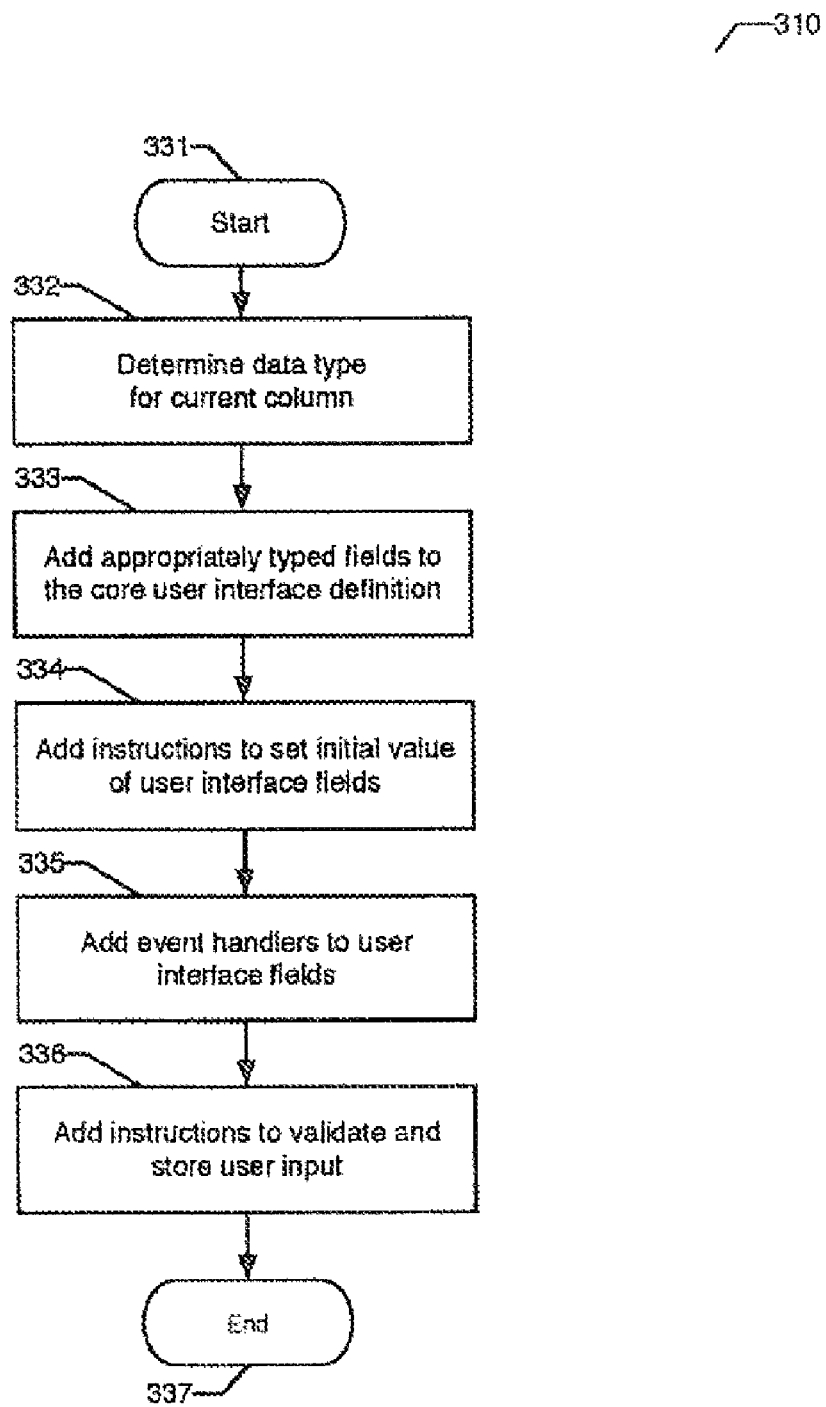
FIG. 7 is a flowchart illustrating the method aspects of the present invention relating to the steps in updating core user interface files for a single data column.

A non-limiting example of the steps included in updating user interface files for a single data column, according to an embodiment of the present invention, is illustrated in FIG. 7 as a flowchart 310. From the start (Block 331) it can be determined what data type the currently processing column is designed to store, as understood by those having skill in the art, in Block 332. Once the data type of the currently processing column is determined in Block 332, user interface fields having the appropriate data type may be added to a set of user interface files in Block 333. A person having skill in the art, after having the benefit of this disclosure, would recognize that an appropriate user interface field type might be dictated both by the data type of the associated data column and the type of user interface file updated. For example, but not intended as a limitation, a data column designed to store only one of a limited number of possible values, e.g., storing two values for the state portion of a mailing address, may be best represented on an editing user interface or inserting user interface as a drop down field, as understood by those having skill in the art. The same data column, however, may be best represented as a label or text box, as understood by those having skill in the art, on a user interface where the value may be read-only, such as a content viewing user interface.

Once appropriately typed user interface fields have been added to a set of user interface files in Block 333, instructions may be added to the executable portions of those user interface files in Block 334, such that upon execution of a content management system 400, the user interface fields may display a correct initial value. A person having skill in the art, after having the benefit of this disclosure, would appreciate that correct initial values may be dictated by the data type of the associated data column, the value stored in that associated data column, and the type of user interface file updated. For example, but not intended as a limitation, a data column designed to store numeric data may have a correct initial value of zero on a content inserting user interface. The correct initial value for a user interface field associated with the same data column, however, may be the value stored in a content repository where the user interface file be updated to correspond to a content viewing or editing user interface. In instances wherein the correct initial value for a user interface field should be the value stored in a content repository, that value may advantageously be retrieved using a getter member function associated with the same data column in a core class definition, as described above in reference to FIG. 6. A person having skill in the art, after having the benefit of this disclosure, would appreciate that a correct initial value might also be retrieved from a local data structure residing in volatile memory, which has previously been read from a content repository.

After instructions have been added to set a correct initial value for user interface fields in Block 334, event handlers, as understood by those having skill in the art, may be added to user interface fields in Block 335. A person having skill in the art, after having the benefit of this disclosure, would appreciate that which events should be handled and how may be dictated by both the data type of the associated data column and the type of user interface file updated. For example, an event handler may be added to a user interface field on a content inserting or editing user interface that sets or clears an enabled flag on an accept button, as those terms are understood by persons having skill in the art, based on whether the value inputted into the user interface field by a user is valid for the associated data column.

Once event handlers have been added to user interface fields in Block 335, instructions may be added to the executable portions of the appropriate user interface files in Block 336, such that upon execution of a content management system, the values specified by a user for each data column may be validated and recorded to a content repository. A person having skill in the art, after having the benefit of this disclosure, would appreciate that the steps in validating user-specified values may be dictated by the data type of the associated data column and any constraints imposed by the content repository. For example, but not intended as a limitation, a string value data column, which may have a maximum length and may not allow null input values, as understood by those having skill in the art, may dictate that any validation routine verifies the length of the user-specified input and whether any input has been specified at all. Validated input may be stored in a content repository using a setter member function associated with the same data column in a core class definition, as described above in reference to FIG. 7. A person having skill in the art, after having the benefit of this disclosure, would appreciate that a user-specified value might also be stored to a local data structure residing in volatile memory, to be written to a content repository later. Once instructions have been added to validate and store the user-specified data in Block 336, the method may be ended at Block 337.

Figure 8:
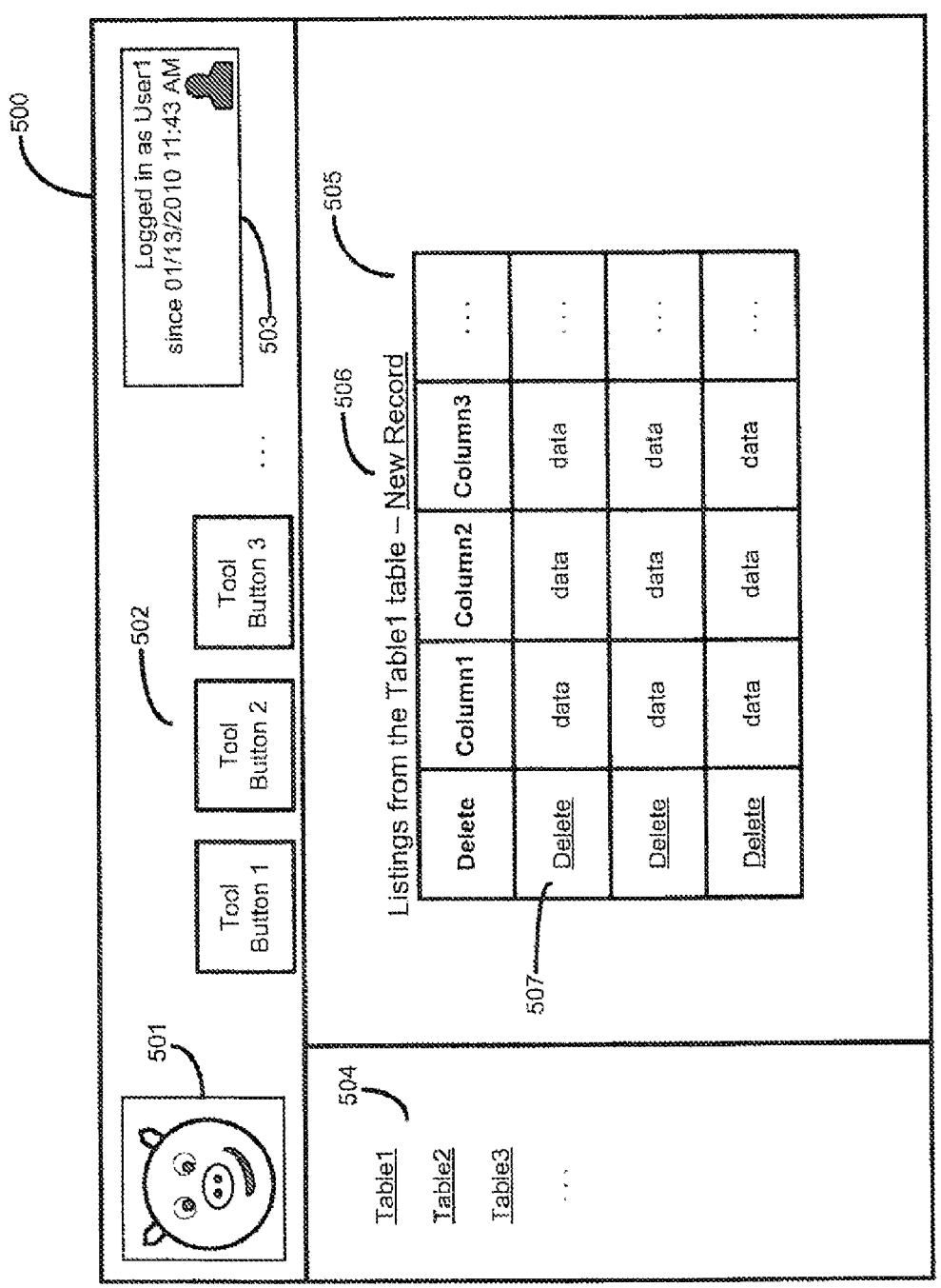
FIG. 8 is a schematic diagram representing a table viewing user interface, which is configured in accordance with an exemplary embodiment of the present invention.

In FIG. 8, a schematic diagram of a table viewing user interface 500 is provided, according to an embodiment of the present invention. An exemplary table viewing user interface 500, which is suitable for display on, for example, but not intended as a limitation, a monitor 191, and for displaying the contents of a data table 405, may advantageously include a configurable logo display 501, a plurality of configurable tool buttons 502, a user credentials display 503, a table list display 504, a table content display 505, a "New Record" link 506, and a one or more "Delete" links 507.

A configurable logo display 501, according to an embodiment of the present invention, may be provided in the form of a standard image control, as understood by those having skill in the art, or in the case of a user interface that is defined using hypertext, an "img" tag might be used. It would be apparent to those having skill in the art, after having the benefit of this disclosure, that any suitable image file may be displayed in a configurable logo display 501, according to configuration settings that are specified by a user.

A plurality of configurable tool buttons 502, according to an embodiment of the present invention, may be provided in the form of a plurality of command buttons, as understood by those having skill in the art, or in the case of a user interface that is defined using hypertext, a plurality of "input" tags, having their "type" attributes set to "button" might be used. As another non-limiting example, a plurality of hyperlinks, as understood by those having skill in the art, may also be used to provide configurable tool buttons 502. After having the benefit of this disclosure, it would be apparent to those having skill in the art that a user might desire to have one or more functions available when utilizing a table viewing user interface 500. In order to conveniently access those functions, each function may be associated with a corresponding configurable tool button 502, which may have been configured to execute the desired function when actuated. Appropriate functions may be provided according to configuration settings that are specified by a user.

A user credentials display 503, according to an embodiment of the present invention, may be provided in the form of a graphical control providing text or images to designate which user credentials have been used to connect to a content repository, as understood by those having skill in the art. In a non-limiting example, the content management system 400 may advantageous to provide information indicating how long a user has been connected to a content repository in a user credentials display 503.

A table content display 505, according to an embodiment of the present invention, may be provided in the form of a data grid view, as understood by those having skill in the art. A suitable table content display 505 may be configured to display one or more records from a data table 405. A person having skill in the art, after having the benefit of this disclosure, would appreciate that a table content display 505 may be configured to interact with a data table class 404, such that the records from a desired data table 405 may be queried and retrieved for display in a table content display 505. Each record displayed in a table content display 505 may be configured such that a record editing user interface 700 may be displayed in response to a user actuating a particular record by, for example, but not intended as a limitation, clicking the appropriate region of a desired record display with a mouse 161.

One or more "Delete" links 507, according to an embodiment of the present invention, may be provided in the form of hyperlinks, as understood by those having skill in the art, with each record displayed in a table content display 505 having an associated "Delete" link 507. A person having skill in the art, after having the benefit of this disclosure, would recognize that each of a plurality of "Delete" links 507 may be configured such that using a mouse 161 to click an individual hyperlink would trigger the deletion of an associated record from a data table 405 as displayed in a table content display 505. A warning may be advantageously presented to users to confirm the deletion of a record associated with a "Delete" link 507, giving users an opportunity to cancel a corresponding unintentional deletion.

A table list display 504, according to an embodiment of the present invention, may be provided in the form of a plurality of hyperlinks, as understood by those having skill in the art, with each of the plurality of hyperlinks being associated with a data table 405. Each of the plurality of hyperlinks may be configured such that using a mouse 161 to click an individual hyperlink would trigger an update of a table content display 505 to show the contents of an associated data table 405. A person having skill in the art, after having the benefit of this disclosure, would recognize that a table list display 504 might also be provided as a data list, as understood in the art, having a plurality of list items, each associated with a single data table 405 and each configured to respond to a mouse click by triggering an update of a table content display 505 to show the contents of an associated data table 405. As another, non-limiting example, wherein a desired table viewing user interface 500 is created as an ASP.NET web form, a repeater control, as understood by those having skill in the art, may be used to build and present a table list display 504, such that an appropriate portion of HTML code is repeated once for each data table 405 in a content repository.

A "New Record" link 506, according to an embodiment of the present invention, may be provided in the form of a hyperlink, as understood by those having skill in the art, wherein a "New Record" link 506 may be configured to open a record adding user interface 600 when actuated.

Figure 9:
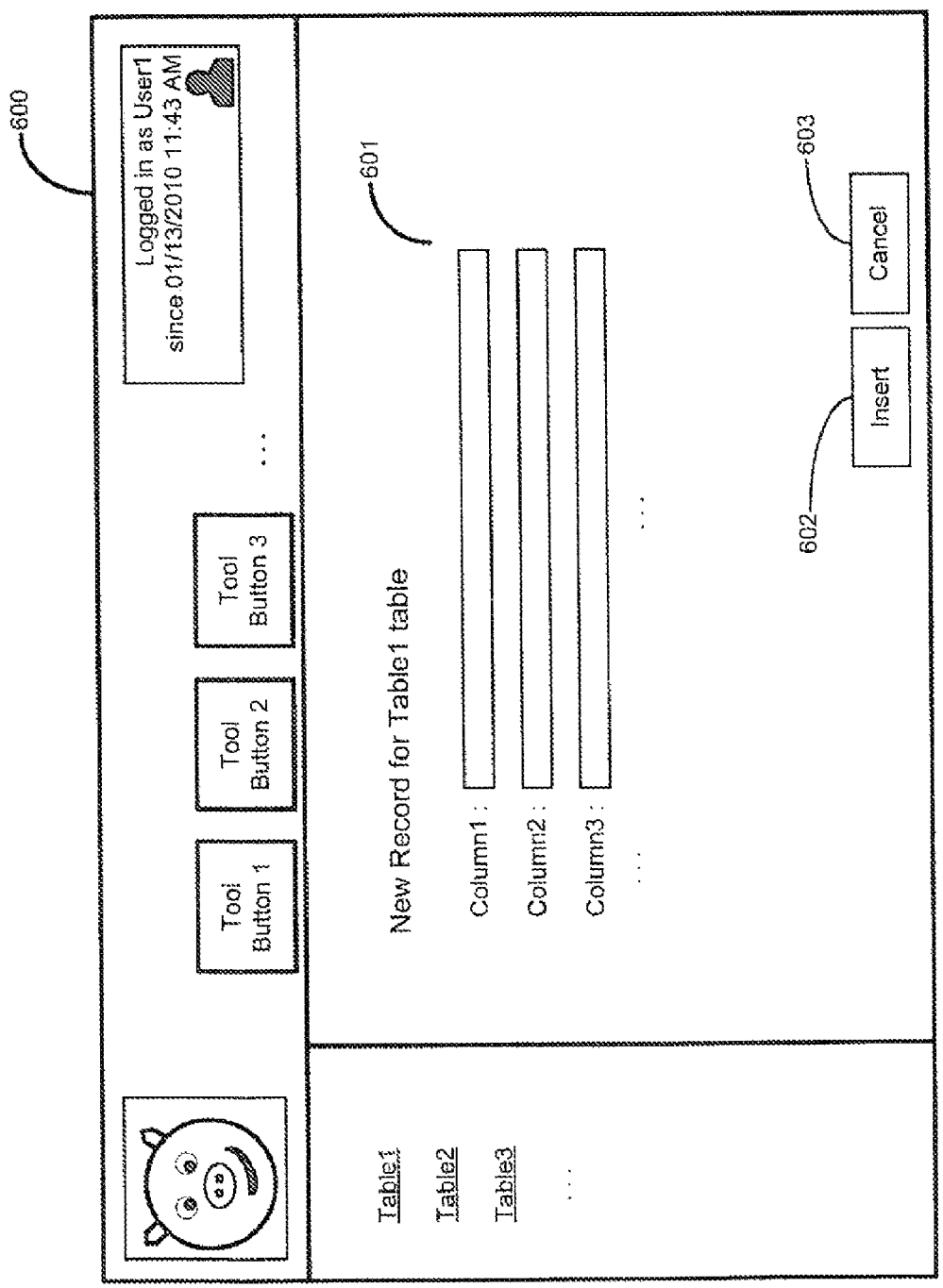
FIG. 9 is a schematic diagram representing a record adding user interface, which is configured in accordance with an exemplary embodiment of the present invention.

In FIG. 9, a schematic representation of a record adding user interface 600 is provided, according to an embodiment of the present invention. An record adding user interface 600 suitable for display on, for example, but not intended as a limitation, a monitor 191, and for adding a new record to a data table 405, may advantageously contain a plurality of new record data input fields 601, an "Insert" button 602, and a "Cancel" button 603.

A plurality of new record data input fields 601, according to an embodiment of the present invention, may be provided in the form of a plurality of text boxes, as understood by those having skill in the art, with each text box being associated with a column in a data table 405. Such text boxes may be capable of taking user input that is provided by depressing the appropriate keys on a keyboard 162 while the input focus is within one of a plurality of text boxes. Appropriate text boxes may be configured to reflect restrictions inherent in a data table, such as limiting a user's input to a maximum number of input characters for a particular column.

A person having skill in the art, after having the benefit of this disclosure, would recognize that other data entry controls, other than a text box, may be more appropriate based on the data type associated with a particular column of a data table 405, or even based on one or more relational constraints of a content repository. As a non-limiting example, a new record data input field 601 may be provided as a drop down where there is a limited number of possible valid input values for a particular column of a data table 405, thereby restricting a user's input to only appropriate input. As another non-limiting example, check boxes may be used in association with columns that receive Boolean values, as understood by those having skill in the art. Other constraints on a data table 405, such as which columns contain required data, which cannot be presented as a NULL value, may be indicated in association with one or more new record data input fields 601.

An "Insert" button 602 may be provided in the form of a command button, as understood by those having skill in the art. In the case of a user interface that is defined using hypertext, an "input" tag having its "type" attribute set to "button" might be used. As another, non-limiting example, a hyperlink may also be used to provide an "Insert" button 602. After having the benefit of this disclosure, it would be apparent to a person having skill in the art that, when actuated with, for example, but not intended as a limitation, a mouse 161, an "Insert" button 602 may be configured to trigger an update of a data table 405, by calling one or more methods of a data table class 404 to insert a new record having values indicated in a plurality of new record data input fields 601. A record adding user interface 600 may be configured to execute instructions that validate a user's input values, before attempting to update a data table 405, such that invalid or missing values may be corrected where required. After an appropriate modification has been successfully made to a data table 405, a content management system may be configured to display, a table viewing user interface 500, reflecting the contents of the newly updated data table 405.

A "Cancel" button 603, according to an embodiment of the present invention, may be provided in the form of a command button, as understood by those having skill in the art, or in the case of a user interface that is defined using hypertext, an "input" tag, having its "type" attribute set to "button" might be used. As another, non-limiting example, a hyperlink, as understood by those having skill in the art, may also be used to provide a "Cancel" button 603. After having the benefit of this disclosure, it would be apparent to a person having skill in the art that, when actuated with, for example, but not intended as a limitation, a mouse 161, a "Cancel" button 603 may be configured to discard the values specified in a plurality of new record data input fields 601 and return a content management system's display to a table viewing user interface 500.

Figure 10:
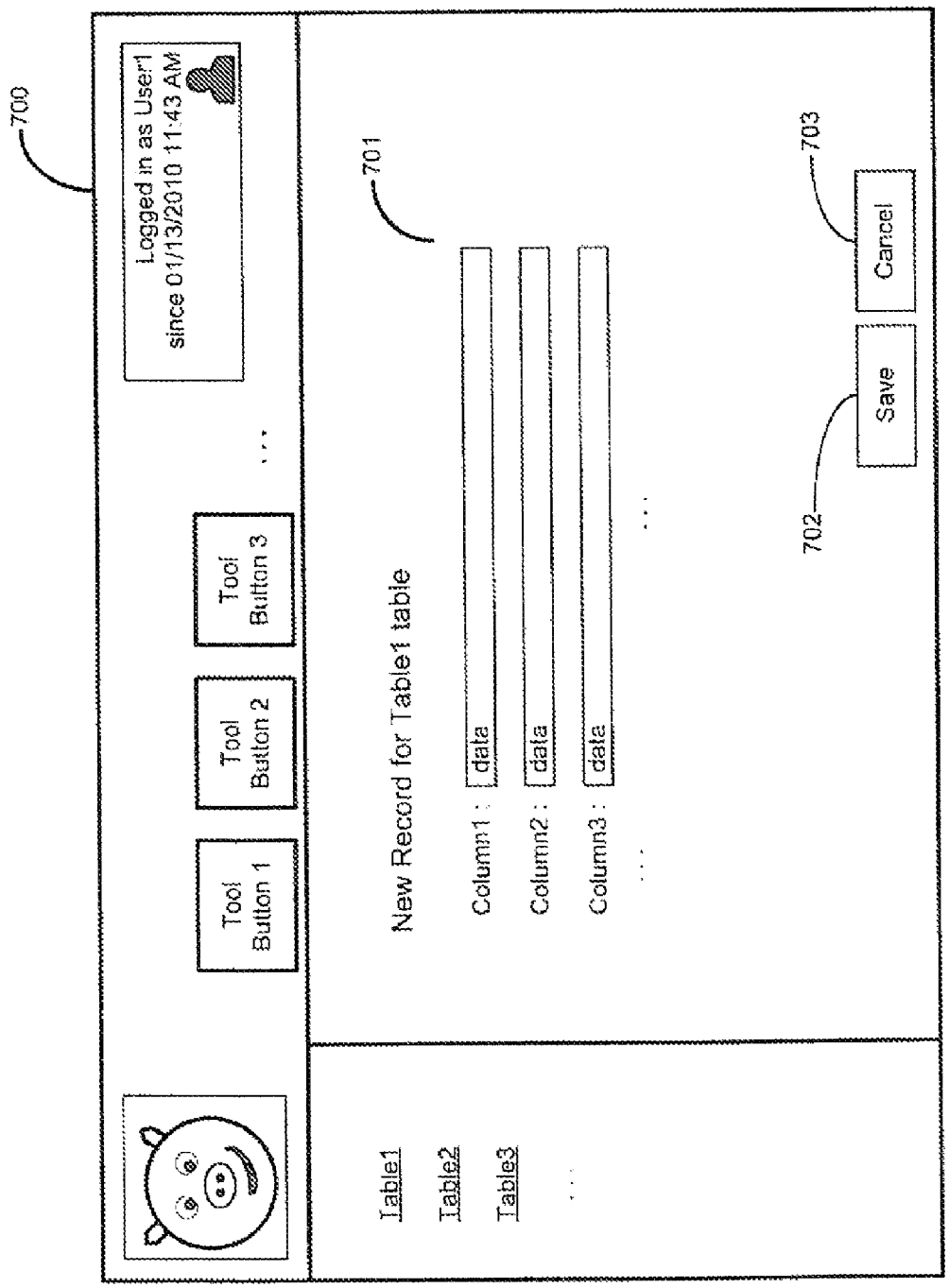
FIG. 10 is a schematic diagram representing a record editing user interface, which is configured in accordance with an exemplary embodiment of the present invention.

In FIG. 10, a schematic representation of a record editing user interface 700 is provided, according to an embodiment of the present invention. An exemplary record editing user interface 700, which may be suitable for display on, for example, but not intended as a limitation, a monitor 191, and for editing the contents of a record from a data table 405, may advantageously include one or more data edit fields 701, a "Save" button 702, and a "Cancel" button 703.

One or more data edit fields 701, according to an embodiment of the present invention, may be provided in the form of a plurality of text boxes, as understood by those having skill in the art, with each text box being associated with a column in a data table 405, wherein each of the plurality of data edit fields 701 is initially filled to reflect the current values of a selected data record. Such text boxes may be capable of receiving user input that is provided by depressing the appropriate keys on a keyboard 162 while the input focus is within a text box. Appropriate text boxes may be configured to reflect restrictions inherent in a data table, such as limiting a user's input to a maximum number of input characters for a particular column. It may be advantageous to represent certain columns on a record editing user interface 700 as "read-only" fields, as understood by those having skill in the art, where a particular field should not be edited. An example of a "read-only" field may include a primary key field, as understood by those having skill in the art.

A person having skill in the art, after having the benefit of this disclosure, would recognize that other data entry controls, other than a text box, may be more appropriate based on the data type associated with a particular column of a data table 405, or even based on one or more relational constraints of a content repository. As a non-limiting example, a new record data input field 701 may be provided as a drop down where there is a number of possible valid input values for a particular column of a data table 405, thereby restricting a user's input to only appropriate input. As another, non-limiting example, check boxes may be used in association with columns that receive Boolean values, as understood by those having skill in the art. Other constraints on a data table 405, such as which columns contain required data, which cannot be presented as a NULL value, may be indicated in association with one or more new record data input fields 701.

A "Save" button 702, according to an embodiment of the present invention, may be provided in the form of a command button, as understood by those having skill in the art, or in the case of a user interface that is defined using hypertext, an "input" tag, having its "type" attribute set to "button" might be used. As another, non-limiting example, a hyperlink, as understood by those having skill in the art, may also be used to provide a "Save" button 702. After having the benefit of this disclosure, it would be apparent to a person having skill in the art that, when actuated with, for example, but not intended as a limitation, a mouse 161, a "Save" button 702 may be configured to trigger an update of a data table 405 by calling one or more methods of a data table class 404 to change the values in a desired record to those indicated in a plurality of record data edit fields 701. A record editing user interface 700 may be configured to execute instructions that validate a user's input values, before attempting to update a data table 405, such that invalid or missing values may be corrected where required. After an appropriate modification has been successfully made to a data table 405, a content management system 400 may be configured to display a table viewing user interface 500, reflecting the contents of the newly updated data table 405.

A "Cancel" button 703, according to an embodiment of the present invention, may be provided in the form of a command button, as understood by those having skill in the an. In the case of a user interface that is defined using hypertext, the "Cancel" button 703 may be provided in the form of an "input" tag, having its "type" attribute set to "button." As another non-limiting example, a hyperlink, as understood by those having skill in the art, may also be used to provide a "Cancel" button 703. After having the benefit of this disclosure, it would be apparent to a person having skill in the art that, when actuated with, for example, but not intended as a limitation, a mouse 161, a "Cancel" button 703 may be configured to discard the values specified in a plurality of record data edit fields 701 and return a content management system's display to a table viewing user interface 500.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

What is claimed is:

1. A computer program product embodied in a computer-readable storage medium for creating a content management system comprising:
    a user interface to prompt a user for input of data source information to locate an existing content repository and of a desired location to store the content management system;
    a content management system creator to create the content management system from the existing content repository, the existing content repository including one or more existing data tables, the content management system comprising:
        a data storage tier that includes a derived content repository including derived data tables,
        a data logic tier in communication with the data storage tier that includes data table classes to control exchanging data with the derived data tables, the data table classes directing movement of data between the derived data tables, and
        a user interface tier in communication with the data storage tier and the data logic tier that includes user interface definitions which include at least one of a viewing user interface, a record adding user interface, and a record editing user interface; and
    a set of core files that include the data table classes selectable by the content management system creator;
    wherein the computer program product
        receives the data source information and the desired location,
        copies core files that are selected by the content management system creator from the set of core files to a destination directory structure located at the desired location,
        establishes a connection with the existing content repository using the data source information,
        incorporates information relating to the connection into the derived data tables,
        retrieves and analyzes a list of the one or more existing data tables to identify the one or more existing data tables that have not been processed from the list of the one or more existing data tables,
        processes the one or more existing data tables that have not been processed,
        creates a core class definition file for the one or more existing data tables identified as having not been processed, the core class definition file including the data table classes controlling exchange of data with the derived data tables, and
        creates a core interface file that defines the user interface definitions.

2. A computer program product according to claim 1 wherein the user interface includes at least one of an input field, a button, a creation option, and a progress display.

3. A computer program product according to claim 1 wherein the core files include at least one of a project file and a core parent class file.

4. A computer program product according to claim 1 wherein the content management system creator retrieves data from the one or more existing data tables by executing a query statement that returns data included in the one or more existing data tables.

5. A computer program product according to claim 1 wherein the viewing user interface presents records in the derived data table; wherein the record adding user interface allows creation of records in the derived data table; and wherein the record editing user interface allows modification of records in the derived data table.

6. A computer program product according to claim 1 wherein at least one of the data source information and the desired location is validated.

7. A method of using a computer program product embodied in a computer-readable storage medium for creating a content management system, the computer program product comprising a user interface to provide interaction with the computer program product, and a content management system creator to create the content management system from a set of core files that include data table classes selectable by the content management system creator, the method comprising:
    prompting a user for input of data source information to locate an existing content repository and of a desired location for storing the content management system via the user interface, wherein content in the existing content repository includes one or more existing data tables;
    receiving the data source information and the desired location;
    copying core files that are selected by the content management system creator from the set of core files to a destination directory structure located at the desired location;
    establishing a connection with the existing content repository using the data source information;
    retrieving and analyzing a list of the one or more existing data tables to identify the one or more existing data tables that have not been processed from the list of the one or more existing data tables;
    processing the one or more existing data tables that have not been processed; and
    creating the content management system, which further includes the steps of:
        creating a data storage tier that includes a derived content repository including derived data tables,
        creating a data logic tier that includes data table classes that direct movement of data between the derived data tables, the data logic tier controlling an exchange of data with the derived data tables and being in communication with the data storage tier,
        creating a user interface tier in communication with the data storage tier and the data logic tier that includes user interface definitions which include at least one of a viewing user interface, a record adding user interface, and a record editing user interface, creating a core class definition file for the one or more existing data tables identified as having not been processed, the core class definition file including the data table classes controlling exchange of data with the derived data tables, and creating a core interface file that defines the user interface definitions.

8. A method according to claim 7 wherein the user interface includes at least one of an input field, a button, a creation option, and a progress display.

9. A method according to claim 7 wherein the core files include at least one of a project file and a core parent class file.

10. A method according to claim 7 wherein the content management system creator retrieves data from the one or more existing data tables by executing a query statement, the query statement returning data included in the one or more existing data tables.

11. A method according to claim 7 wherein the viewing user interface presents records in the derived data table; wherein the record adding user interface allows creation of records in the derived data table; and wherein the record editing user interface allows modification of records in the derived data table.

12. A method according to claim 7 further comprising validating at least one of the data source information and the desired location.

13. A method of using a computer program product embodied in a computer-readable storage medium comprising:

receiving data source information via a user interface to locate an existing content repository and a desired location for storing a content management system to be created from a set of core files that include data table classes;

copying core files that are selected by a content management system creator from the set of core files to a destination directory structure located at the desired location;

establishing a connection with the existing content repository using the data source information, the existing content repository including one or more existing data tables;

retrieving and analyzing a list of the one or more existing data tables to identify the one or more existing data tables that have not been processed from the list of the one or more existing data tables;

processing the one or more existing data tables that have not been processed;

creating the content management system comprising a data storage tier that includes a derived content repository including derived data tables;

creating a data logic tier that includes the data table classes that direct movement of data between the derived data tables, the data logic tier controlling an exchange of data with the derived data tables and being in communication with the data storage tier;

creating a user interface tier in communication with the data storage tier and the data logic tier that includes user interface definitions which include at least one of a viewing user interface, a record adding user interface, and a record editing user interface;

creating a core class definition file for the one or more existing data tables identified as having not been processed, the core class definition file including the data table classes controlling exchange of data with the derived data tables; and creating a core interface file that defines the user interface definitions.

14. A method according to claim 13 wherein the user interface includes at least one of an input field, a button, a creation option, and a progress display.

15. A method according to claim 13 wherein the core files include at least one of a project file and a core parent class file.

16. A method according to claim 13 wherein the content management system creator retrieves data from the one or more existing data tables by executing a query statement, the query statement returning data included in the one or more existing data tables.

17. A method according to claim 13 wherein the viewing user interface presents records in the derived data table; wherein the record adding user interface allows creation of records in the derived data table; and wherein the record editing user interface allows modification of records in the derived data table.

18. A method according to claim 13 further comprising validating at least one of the data source information and the desired location.

* * * * *